Sept. 3, 1946.   W. E. KRUSE ET AL   2,406,778
SLURRYING ALUMINUM CHLORIDE FOR HYDROCARBON CONVERSION PROCESSES
Filed Dec. 15, 1941
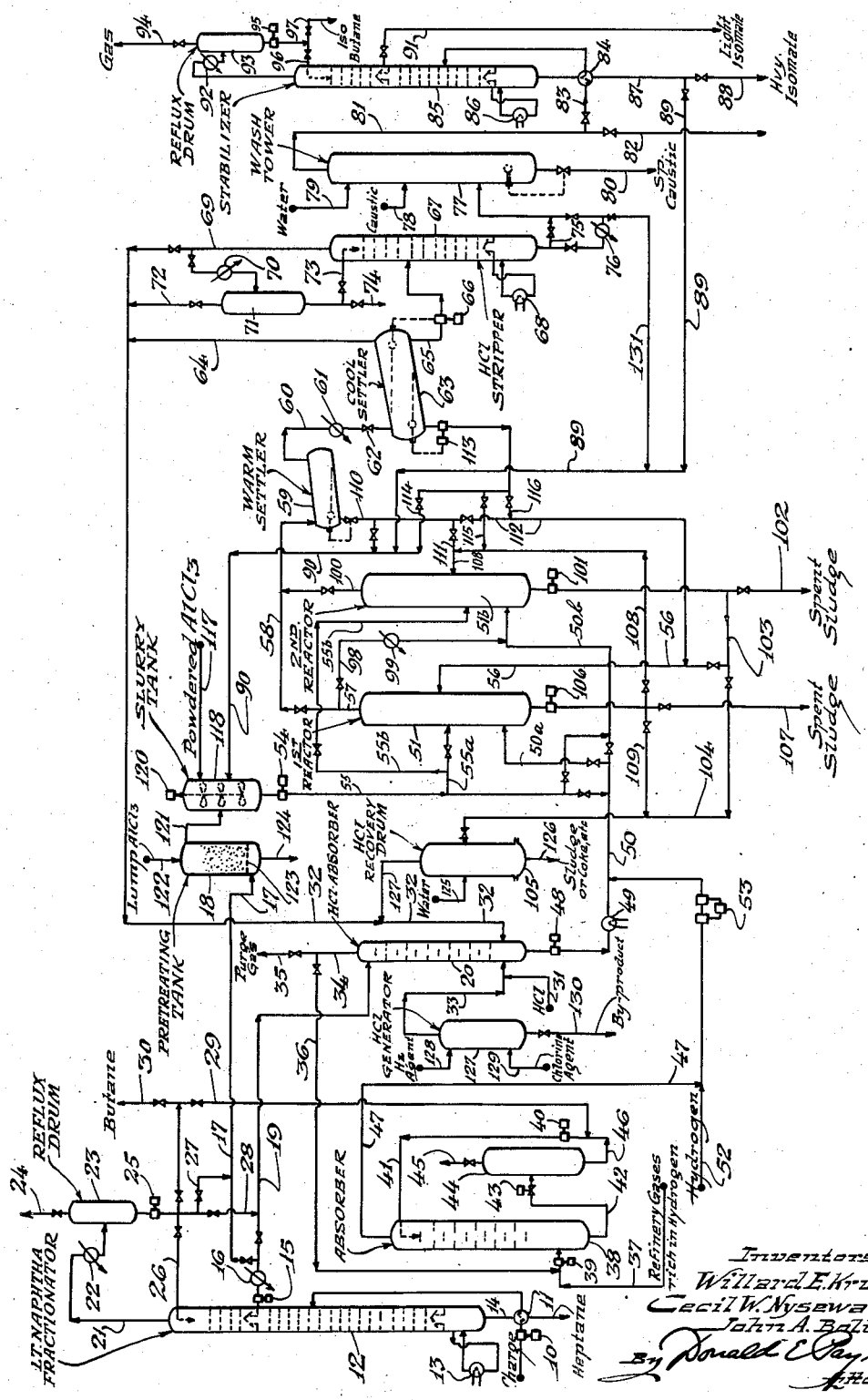
Inventors:
Willard E. Kruse
Cecil W. Nysewander
John A. Bolt
By Donald E. Payne
Attorney Patented Sept. 3, 1946

2,406,778

UNITED STATES PATENT OFFICE 2,406,778

SLURRYING ALUMINUM CHLORIDE FOR HYDROCARBON CONVERSION PROCESSES

Willard E. Kruse, Chicago, Ill., Cecil W. Nysewander, Highland, Ind., and John A. Bolt, Chicago, Ill., assignors to Standard Oil Company, Chicago, Ill., a corporation of Indiana Application December 15, 1941, Serial No. 422,981

2 Claims. (Cl. 260—683.5)

This invention relates to improvements in aluminum chloride hydrocarbon conversion processes and it pertains more particularly to improved methods and means for introducing make-up aluminum chloride into a continuous conversion reactor.

In certain continuous aluminum chloride hydrocarbon conversion processes such as cracking, polymerization, alkylation, isomerization, etc., it is essential to effect a continuous or intermittent introduction of make-up aluminum chloride in order to maintain catalyst activity at the desired level. An object of our invention is to provide an improved method and means for supplying make-up aluminum chloride to such a continuous reaction chamber. A further object is to provide a new and improved aluminum chloride isomerization system wherein liquids produced in the system may serve as a vehicle for introducing make-up aluminum chloride.

Considerable trouble has been experienced with the maintenance of aluminum chloride slurries in hydrocarbon charging stocks such, for example, as light naphtha. Thus in a system for injecting aluminum chloride into a light naphtha isomerization reactor where a slurry of 2 pounds of finely ground aluminum chloride per gallon of 153° F. end point naphtha feed stock is employed, at least 75% of the aluminum chloride settles out of the naphtha at a rate of 20 to 30 feet per minute. Furthermore, on contacting the fresh feed the aluminum chloride almost immediately becomes sticky and tends to form a paste. It appears that the naphtha contains a small amount of material which reacts readily with the aluminum chloride to form an adhesive. A thorough drying of the charging stock does not avoid the tendency of the catalyst to agglomerate and become sticky, and it, therefore, appears that the trouble is caused by the nature of the charging stock itself or by a trace of adhesive-forming materials in said charging stock. An object of our invention is to avoid the formation of sticky or adhesive substances in such catalyst slurries and to avoid the clogging of lines, pumps, valves, injection means, etc., through which the slurry must be passed en route to the reaction chamber.

A further object of our invention is to provide a more efficient utilization of liquids separated from isomerization products in an isomerization reaction system. Other objects will become apparent as the detailed description of our invention proceeds.

We have discovered that if the hydrocarbon feed stock such as light naphtha is previously treated with aluminum chloride before it is employed for making up the aluminum chloride slurry, the resulting slurry will remain in suspended form for an extended period of time. Slurries of make-up aluminum chloride which are formed by the use of such pretreated naphtha can be readily handled and injected into the system. Even in the case of a pretreated slurrying vehicle, however, it is desirable to avoid a prolonged time between slurry formation and actual slurry injection.

We have discovered that a remarkably and unusually stable aluminum chloride slurry results from the use as slurrying agents of liquids which have already undergone treatment in the isomerization reaction itself. Products directly from the reactor (or from the settlers following the reactor) are usually contaminated with complex material that would be deleterious in the slurrying step; products from these points also contain dissolved hydrogen chloride which promotes complex formation and which is hence objectionable in the slurrying step. However, the cooled product from which hydrogen chloride has been removed is an excellent source of slurrying liquid. Also, the heavy ends of the isomerization products, i. e., components boiling just above neohexane, are also effective for producing a stable slurry which is substantially free from sticky and adhesive materials; the recycling of this heavy isomate fraction serves the additional and important function of increasing the neohexane production in the isomerization system.

It might be supposed that since products from the isomerization system are effective slurrying agents that light iso-paraffins would likewise be effective. A test with isooctane as a slurrying agent showed that this agent was even worse than untreated light naphtha charging stock. The use of isooctane resulted in an adhesive mass that settled and stuck to the bottom of a container. Isooctane is thus utterly worthless as a slurrying agent.

The sludge produced in the aluminum chloride pretreating step (or spent sludge from the isomerization reaction zone) may be introduced into a high pressure hydrogen chloride generator and treated with a hydrolyzing agent such as sulfuric acid or water in order to supply at least a part of the necessary make-up hydrogen chloride which is required in the isomerization reaction. Alternatively it may be used as catalyst material in the isomerization reactor, being introduced separately or with recycled complex and not with the make-up catalyst slurry.

Our invention will be more clearly understood from the following detailed description read in conjunction with the accompanying drawing which forms a part of this specification and which is a schematic flow diagram of an improved system for isomerizing light naphtha.

While our invention is applicable to a wide variety of aluminum chloride-hydrogen chloride hydrocarbon conversion processes, it is particularly applicable in the process for isomerizing a light naphtha consisting essentially of paraffinic hydrocarbons of the butane to hexane boiling range. Referring to the drawing, a virgin naphtha charging stock is introduced by pump 10 through heat exchanger 11 to fractionating tower 12 which is provided with suitable heating means 13 at its base and which is operated under such conditions that heptanes and heavier hydrocarbons are removed from the base through line 14. An intermediate cut consisting essentially of $C_5$, $C_6$ or $C_5$ and $C_6$ hydrocarbons may be withdrawn by pump 15 (a plurality of towers will be used for the fractionation in actual practice, the side stream being a diagramatic representation) through heater 16 and then split into two streams, the small stream passing by line 17 to pretreating tank 18 and the large stream passing by line 19 to hydrogen chloride absorber 20. When the make-up aluminum chloride is slurried with recycled material, the valve in line 17 may be closed and all of the charging stock may be passed to the absorber.

Overhead from fractionator 12 is withdrawn through line 21 and cooler 22 to reflux drum 23 from which uncondensed gases may be vented through line 24. When an intermediate cut has been withdrawn, the reflux condensate may consist essentially of butane (or a mixture of butanes and pentanes) which is withdrawn from the base of the drum by means of pump 25. A portion of this reflux condensate may be returned through line 26 to serve as reflux in the top of tower 12. Reflux condensate from this source may also be introduced through line 27 to line 17, through line 28 to line 19, through line 29 to a hydrogen absorber system, or through line 30 to storage or to a point of use elsewhere in the refinery.

The hydrogen chloride absorber 20 is preferably operated under a superatmospheric pressure which may range from about 50 to 350 or more pounds per square inch but which is preferably in the general vicinity of 200 to 250 pounds per square inch. Make-up hydrogen chloride may be introduced through lines 31 or 33 and a gaseous stream containing hydrogen chloride is introduced at the base of this absorber through line 32. Unabsorbed gases, chiefly hydrogen, methane, ethane, etc., leave the top of the absorber through line 34 and may be vented from the system through line 35 or introduced through line 36 together with additional hydrogen containing gases from line 37 into the base of absorber 38, a suitable compressor 39 being employed for this purpose. Butane from line 29 may be introduced by pump 40 and line 41 to the top of absorber 38. This absorber may be provided with suitable baffles or bubble plates and it may be operated at a temperature of about 100° F. and a pressure of about 900 pounds per square inch. Gaseous hydrocarbons are absorbed and introduced through line 42 and pressure reducing valve 43 into separating chamber 44 which may operate under about 35 pounds pressure. Hydrocarbon gases may be purged from the system through line 45 and the butane from the base of the separator may be returned through line 46, pump 40 and line 41 back to the top of the absorber. Hydrogen leaves the top of the absorber through line 47.

The charging stock-hydrogen chloride solution from the base of absorber 20 is forced by pump 48 through heater 49 and lines 50 and 50a into isomerization reactor 51. Hydrogen from line 47 or from outside source 52 is introduced by compressor 53 either into line 50 or directly into reactor 51. Make-up aluminum chloride in the form of a slurry is introduced into reactor 51 from a slurry tank by means of pump 54 and line 55. Aluminum chloride or complex from other parts of the system are introduced into the reactor through line 56.

The reactor contains a large amount of aluminum chloride catalyst material which is usually in the form of an aluminum chloride hydrocarbon complex. The charging stock passes upwardly through this catalyst material in finely divided dispersed phase at a space velocity of about .2 to 4 volumes of liquid charging stock per hour per volume of catalyst material. The temperature in the reactor is within the range of 100 to 400° F. and is usually in the general vicinity of 250° F. The pressure in the reactor is in the range of 500 to 1500 pounds per square inch and may be about 850 pounds per square inch. Reaction products are withdrawn from the top of reactor 51 through lines 57 and 58 to warm settler 59 and thence through line 60, cooler 61 and pressure reducing valve 62 to cool settler 63. Gases leave the top of the cool settler through line 64 and are returned by line 32 to hydrogen chloride absorber 20.

Clear product liquids leave the cool settler through line 65 and are introduced by pump 66 into hydrogen chloride stripper column 67 which is provided with a suitable heating means 68 at its base. The overhead from this stripper may be passed through line 69 to line 32 for recycling or may be passed through cooler 70 to reflux drum 71. Gases from the top of this drum pass by lines 72 and line 32 to the hydrogen chloride absorber 20 and liquids from the base of this drum may be either returned by line 73 for use as reflux in the top of the stripper or may be withdrawn through line 74. The product from line 74 is chiefly isobutane and when it is passed to an aluminum chloride alkylation system it is unnecessary that dissolved hydrogen chloride be removed therefrom. Stripper tower 67 may thus function both as a hydrogen chloride stripper and as a stabilizer tower.

Liquid products from the base of tower 67 are passed directly by line 75 or through cooler 76 to caustic scrubber and wash tower 77. Caustic may be introduced through line 78 and water through line 79. The wash water may be trapped out above the caustic inlet or the water and caustic may both be removed from the base of the tower through line 80.

The neutralized and water washed product is withdrawn from the top of the wash tower through line 81 and it may either be withdrawn from the system through line 82 or passed through line 83 and heat exchanger 84 to stabilizer or fractionating tower 85 which is provided with a suitable heating means 86 at its base. Heavy isomate or hydrocarbon material may be withdrawn from the base of the stabilizer through line 87 and removed from the system through line 88 or returned through lines 89 and 90 to the slurry tank. A light isomate may be withdrawn as a side stream from tower 85 through line 91. (Here again, a plurality of towers would be used in actual practice.)

Overhead from the stabilizer is passed through cooler 92 to reflux drum 93 from which gases may be vented through line 94. A portion of the reflux may be returned by pump 95 through line 96 to the top of the stabilizer and a light fraction consisting, for example, chiefly of butanes may be withdrawn from the system through line 97.

Instead of employing a single reactor we may employ a multiple reactor system. Thus charging stock with absorbed hydrogen chloride may be introduced through line 50b to reactor 51b and make-up catalyst may be added to this reactor through line 55b. Alternatively, the products leaving the top of reactor 51 may be passed by line 98 through cooler 99 and to reactor 51b and the products from the top of reactor 51b may be passed through line 100 and line 58 to warm settler 59.

Catalyst from the base of reactor 51b may be withdrawn by pump 101 and either withdrawn from the system through line 102, passed by lines 103 and 56 to reactor 51 or passed through lines 103 to line 104 to hydrogen chloride recovery drum 105. Catalyst may be withdrawn from the base of reactor 51 by pump 106 and either withdrawn from the system through line 107, passed to reactor 51b through line 108 or passed to the hydrogen chloride recovery drum through lines 109 and 104. Material from lines 102 or 107 or both may be employed to pretreat naphtha in tank 18.

Settled catalyst material from settler 59 may be passed through lines 111 and 108 to reactor chamber 51b or through lines 112 and 56 to reactor 51. Precipitated catalyst material from cool settler 63 may be pumped as a slurry by pump 113 through lines 114 and 90 to the slurry tank but is preferably pumped through lines 115 and 108 to reactor 51b or through lines 116 and 56 to reactor 51.

Our invention is primarily connected with the supplying of make-up aluminum chloride to the isomerization system hereinabove described. Powdered aluminum chloride from source 117 is introduced into slurry tank 118 by means of any suitable hopper, screw feeder, or other feeding means. Slurry tank 118 may be provided with a suitable mixer or high speed stirrer driven by motor 120. The oil for making up the slurry may be obtained from pretreating tank 18 through line 121 or from various parts of the system through line 90.

In prereating tank 18 the aluminum chloride is preferably in lump form or is deposited on a suitable support such as Kieselguhr or is in the form of a hydrocarbon complex. Thus lump aluminum chloride may be introduced from source 122 and may be retained in the pretreating chamber by screen support 123. Light naphtha from line 17 enters pretreating chamber 118 below screen 123 and passes upwardly through the bed of lump aluminum chloride, leaving the top of the pretreating chamber through line 121. A viscous brownish red complex may be formed by the contacting of charging stock in this pretreating chamber and since this oil complex is heavier than charging stock it settles to the base of the pretreating chamber and may be withdrawn therefrom through line 124 to hydrogen chloride recovery drum 105 or to one of the reactors 51 or 51b through lines 56 or 108.

The pretreating with aluminum chloride in lump form, supported form or complex form in chamber 18 alters the character of the charging stock in such a way as to prevent the formation of sticky adhesive compounds with the powdered aluminum chloride in slurry tank 118. In the absence of the pretreating step the slurry formed in tank 118 rapidly plugs lines 55, 55a, etc. and the pumps, valves, etc. associated therewith. The pretreating step insures the formation of a slurry which is sufficiently free from sticky and adhesive materials so that it will not agglomerate and will not cause a plugging of the transfer lines, pumps and valves.

A hydrolyzing agent such as sulfuric acid or water is introduced into drum 105 through line 125 and the sludge or cokey residue is withdrawn from the drum through line 126. Recovered hydrogen chloride is returned through line 127 and line 32 to absorber 20. If water is used as a hydrolyzing agent it should be employed in less than stoichiometric amounts in order that the recovered hydrogen chloride may be substantially anhydrous. Larger amounts of recovered hydrogen chloride may be obtained by the use of sulfuric acid and such use is particularly advisable where sludge coker means are available for recovering the sulfuric acid.

The hydrogen chloride recovered from chamber 105 may not be sufficient to supply all of the required make-up hydrogen chloride and additional hydrogen chloride may, therefore, have to be added through line 31. The additional hydrogen chloride may be generated in a high pressure generator 127 by adding a hydrogen supplying agent through line 128 and a chlorine supplying agent through line 129. The by-product from this generator may be withdrawn through line 130 and the produced hydrogen chloride may be introduced directly through line 33 into the base of the absorber 20 without the necessity of employing pumps or purifying means. The hydrogen supplying agent may be hydrogen itself, a gas containing hydrogen (e. g., from line 35), a hydrocarbon or sulfuric acid. The chlorine supplying agent may be chlorine gas, sodium chloride, hydrochloric acid, etc. Thus chlorine may be introduced through line 129 and burned with an excess of hydrogen or hydrogen containing gas introduced through line 128 or reacted with a hydrocarbon introduced through line 128. Sodium chloride or aqueous hydrochloric acid may be introduced through line 129 and sulfuric acid may be introduced through line 128.

While the pretreating of a portion of the feed stock with aluminum chloride makes it possible to produce a pumpable slurry in tank 118 we have found that a superior type of slurry is produced by employing liquids recycled from the system through line 90. Such liquid may be withdrawn from the product stream between cooler 76 and wash tower 77 and passed to tank 120 through lines 131, 89 and 90. The product at this point is substantially anhydrous and is free from catalyst material and hydrogen chloride. The "pretreatment" of the charging stock for the preparation of a slurry vehicle is in this instance effected in the isomerization reactor itself.

Another liquid which produces a highly desirable type of slurry is that obtained from the base of stabilizer or fractionator column 85 from lines 87 and 89. This liquid may consist chiefly of methyl pentanes and unisomerized normal hexane. By using this liquid as a slurrying agent for make-up aluminum chloride we not only obtain a highly satisfactory slurry but we also obtain increased yields of neohexane, i. e., we obtain isomerization products of higher octane number and hence of greater value as aviation fuel blending stocks.

While we have described specific examples of our invention in considerable detail it should be understood that our invention is not limited to these particular examples nor to the specific conditions recited therein since other examples and other operating conditions will be apparent to those skilled in the art from the above detailed description.

We claim:

1. The method of isomerizing a paraffinic hydrocarbon charging stock boiling within the butane to hexane boiling range which method comprises absorbing hydrogen chloride in said charging stock in an absorption zone to form a hydrogen chloride solution, heating said solution to isomerization temperature and introducing the heated solution at a low level in a continuous isomerization zone containing a large amount of liquid aluminum chloride-hydrocarbon complex catalyst material, effecting isomerization of said charging stock in said isomerization zone, withdrawing an isomerization product stream containing dissolved catalyst material and hydrogen chloride from the top of the isomerization zone to a settling zone, removing catalyst material from said stream in said settling zone, introducing the stream which still contains hydrogen chloride from said settling zone to a stripping zone, stripping hydrogen chloride from said stream in said stripping zone, returning hydrogen chloride containing gases from the top of the stripping zone to the absorption zone, venting unabsorbed gases from the top of the absorption zone, making up an aluminum chloride slurry of finely divided solid aluminum chloride particles in a portion of the stream after hydrogen chloride has been stripped therefrom and introducing said aluminum chloride slurry into said isomerization zone for maintaining the activity of the liquid aluminum chloride-hydrocarbon complex material contained therein.

2. The method of isomerizing a paraffinic hydrocarbon charging stock boiling within the butane to hexane boiling range which method comprises adding hydrogen chloride to said charging stock, and introducing the charging stock with added hydrogen chloride at a low level into a continuous isomerization zone containing a large amount of liquid aluminum chloride-hydrocarbon complex catalyst material, effecting isomerization of said charging stock in said isomerization zone, withdrawing a product stream containing catalyst material and hydrogen chloride from the upper part of said isomerization zone to a settling zone, removing catalyst material from said stream in said settling zone, introducing said stream from said settling zone to a stripping zone, stripping hydrogen chloride from said stream in said stripping zone, treating the stripped stream with caustic to effect neutralization thereof, fractionating the neutralized product stream to obtain a plurality of fractions including a heavy fraction, making up an aluminum chloride slurry of finely divided aluminum chloride particles in a portion of said heavy fraction and introducing said aluminum chloride slurry into said continuous isomerization zone for maintaining the activity of the liquid aluminum chloride-hydrocarbon complex catalyst material contained therein.

WILLARD E. KRUSE.
CECIL W. NYSEWANDER.
JOHN A. BOLT.